United States Patent [19]

Putt

[11] 4,340,846
[45] Jul. 20, 1982

[54] MAGNETIC APPARATUS FOR PRODUCING MOVEMENT

[76] Inventor: J. William Putt, 1162M S. Cedar Crest Blvd., Allentown, Pa. 18103

[21] Appl. No.: 217,928

[22] Filed: Dec. 18, 1980

Related U.S. Application Data

[63] Continuation-in-part of Ser. No. 634,568, Nov. 24, 1975, abandoned, Ser. No. 758,227, Jan. 10, 1977, Pat. No. 4,121,139, and Ser. No. 951,710, Oct. 16, 1978, Pat. No. 4,249,115.

[51] Int. Cl.³ .............................................. H02K 33/16
[52] U.S. Cl. ..................................... 318/135; 318/121
[58] Field of Search .............. 318/121, 122, 135, 687, 318/134; 310/30, 34; 335/267

[56] References Cited

U.S. PATENT DOCUMENTS

| | | | |
|---|---|---|---|
| 1,296,634 | 3/1919 | De Guire | 318/121 |
| 1,341,657 | 6/1920 | Miller | 318/134 X |
| 1,647,147 | 11/1927 | Roller | 318/121 |
| 3,287,616 | 11/1966 | McNeil | 318/121 X |
| 3,488,614 | 1/1970 | Macy | 335/267 X |
| 3,606,595 | 9/1971 | Tokamizawa | 310/30 X |
| 3,878,412 | 4/1975 | Kurpanek | 310/34 X |
| 4,012,675 | 3/1977 | Sculze, Jr. | 318/134 X |

Primary Examiner—B. Dobeck
Attorney, Agent, or Firm—Beveridge, DeGrandi & Kline

[57] ABSTRACT

A driven paramagnetic member, located between two stationary magnetic members, is moved in opposite directions by alternately energizing intermediate magnets which are located between the stationary members and the driven member. To conserve electrical energy, the ampere-turns of the intermediate magnets are reduced gradually while the members are moving together to reduce the gap thicknesses therebetween.

11 Claims, 6 Drawing Figures

MAGNETIC APPARATUS FOR PRODUCING MOVEMENT

REFERENCE TO RELATED APPLICATIONS

This is a continuation-in-part based on the following U.S. patent applications which are incorporated herein by reference:

Ser. No. 634,568 filed Nov. 24, 1975, now abandoned;
Ser. No. 758,227 filed Jan. 10, 1977, now U.S. Pat. No. 4,121,139; and
Ser. No. 951,710 filed Oct. 16, 1978, now U.S. Pat. No. 4,249,115, which is copending herewith.

BACKGROUND AND SUMMARY OF THE INVENTION

This invention relates to a magnetic apparatus for producing movement, preferably linear movement which is produced by intermittent actuation of electromagnets positioned in an aligned set of relatively movable paramagnetic members.

The prior art is replete with disclosures of linear actuators wherein electromagnets are periodically energized to provide linear movement. Typical examples of the prior art are discussed in and cited against the earlier patent applications mentioned above.

A particular objective of the present invention is to provide a system which is superior to prior art devices in that it will provide a high efficiency and a low weight-to-power ratio.

The invention disclosed herein is an improvement over my earlier devices in two primary respects. First, rather than providing electrical windings on all of the paramagnetic members in the system, the present system utilizes axially movable reactor members which are positioned between the electromagnets and do not themselves create a magnetic field. Second, the invention calls for the reduction of electrical consumption by providing for the gradual reduction of the magnetomotive force of the electromagnets while the gap is being closed by the action of such electromagnets. This reduction of magnetomotive force, while conserving energy, does not significantly reduce the force output of the device since, as the gaps between the members are closing, a lesser magnetomotive force is required to produce any given force of magnetic attraction.

More specifically, the invention relates in one sense to an apparatus which has a pair of relatively movable paramagnetic members which are separated by a gap which opens and closes as the members move relatively away from and toward each other. One of the paramagnetic members is provided with electrical windings which, when energized, produce a magnetic field which will pull the members together and close the gaps between them. The windings are energized by means which causes an electrical current to flow through them to create a magnetomotive force, and control means are provided for gradually reducing the magnetomotive force while the gap is being closed by the field. Preferably, the windings associated with a particular paramagnetic member include a plurality of winding sections, and the control means is constructed and operated to energize simultaneously and deenergize sequentially the sections of windings. The control means preferably is a timer provided with a set of cams which rotate together at a constant angular velocity. A set of electrical switches are sequentially operated by the cams and are connected to respective sections of windings. A single rotary cam may be operatively engaged with switches associated with the windings of two different paramagnetic members.

In another sense, the invention pertains to a system which includes an axially aligned set of paramagnetic members which include a central paramagnetic member and a spaced pair of paramagnetic members which are spaced apart by a constant distance and are located on opposite sides of the central member. Two intermediate paramagnetic members are located where each lies between the central paramagnetic member and one of the spaced pair of members. The energizing means is operable in a first mode to produce movement in a first direction by creating magnetic attraction between one intermediate member, the central member and one of the spaced pair of members. The energizing means is operable in a second mode to produce movement in an opposite direction by creating magnetic attraction between the other intermediate member, the central member and the other one of the spaced pair of paramagnetic members.

In another sense, the invention relates to a set of aligned paramagnetic members which includes a driven paramagnetic member located between two stationary paramagnetic members. A first movable intermediate paramagnetic member is located between one stationary member and the driven member; and, a second movable intermediate paramagnetic member is located between the other stationary member and the driven member. The intermediate members are on opposite sides of the driven member. The energizing means associated with this apparatus is operable in a first mode to create magnetic attraction between the first intermediate member, the driven member and the first stationary member to move the driven member in a first direction. The energizing means is operable in a second mode to create magnetic attraction between the second intermediate member, the driven member and the second stationary member to move the driven member in a second direction which is opposite to the first direction. Means are provided for repeatedly shifting the energizing means between the first mode and the second mode to move the driven member alternately in the first and second directions.

Although the invention may take many forms, the presently preferred embodiments thereof are described in the following text and illustrated in the drawings.

DESCRIPTION OF THE PREFERRED EMBODIMENT

Figure 1:
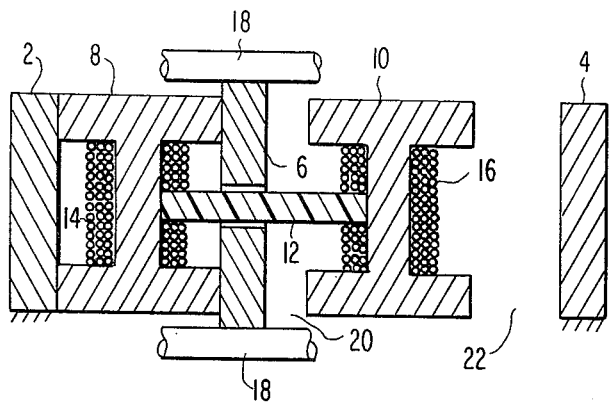
FIG. 1 is a diagramatic view of the invention when the apparatus is at the leftward extremity of its travel.
Figure 2:
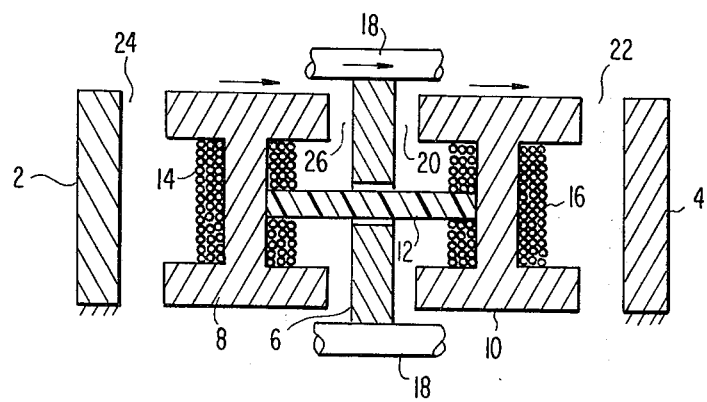
FIG. 2 is a view similar to FIG. 1 but showing the apparatus in the course of its rightward travel.

A simplified apparatus constructed according to the invention is shown in FIGS. 1 and 2. The apparatus includes five paramagnetic members of which the outermost members 2 and 4 are stationary reactors, the central member 6 is a longitudinally movable reactor and the intermediate members 8 and 10 are electromagnets. In this specification, the term "reactor" is used to describe a passive paramagnetic member, i.e. a member which is susceptible to magnetic attraction but does not itself create a magnetic field.

The electromagnets 8 and 10 are relatively movable with respect to the members 2, 4 and 6 and they are rigidly connected together for concurrent movement by a nonmagnetic connector bar 12. The electromagnets are formed of H-shaped paramagnetic cores of commercially available special magnetic alloys, wound with windings 14 and 16 which are energized so that the apparatus shifts back and forth between the left position illustrated in FIG. 1 and a right position which is a mirror image of FIG. 1, thereby causing a reciprocating movement of the central member 6. In this regard, the central member 6 acts as a driven member, and its reciprocating movement is transmitted by crosshead shafts 18 or other suitable connections to a hydraulic pump or other device for utilizing a mechanical input motion.

The windings 14 and 16 of the electromagnets are energized at different times. That is, the windings 14 of electromagnet 8 are energized at one phase of the cycle to create magnetic attraction between the members 2, 6 and 8, moving the driven central member 6 to the left position shown in FIG. 1. During the other phase of a cycle, the windings 14 of electromagnet 8 are deenergized and the windings 16 of electromagnet 10 are energized, causing the members 6, 10 and 4 to be drawn together by magnetic attraction. When this rightward motion is occurring, the apparatus passes through the position shown in FIG. 2. After this motion is completed, the windings 14 of electromagnet 10 are deenergized and the windings 14 of electromagnet 8 are energized, causing the apparatus to return to the FIG. 1 position.

In the position shown in FIG. 1, there is a first gap 20 between the members 6 and 10 and a second gap 22 between the members 4 and 10. When the windings 16 of electromagnet 10 are energized, the magnetic attraction between the members 6, 10 and 4 causes the gaps 20 and 22 to close. This closing motion inherently causes another set of gaps 24 and 26 to open on the left side of the apparatus as shown in FIG. 2. The axial thickness of each air gap, at maximum spacing, should be at least about ⅜ inch to allow a suitable length of travel, and no greater than about 7/16 inch to avoid magnetic losses.

To conserve energy, the disclosed system is provided with controls which gradually reduce the magnetomotive force, i.e. the ampere-turns of the electromagnets, while the gaps between the members are being closed by this force. As the gaps are being closed, their respective axial thicknesses are inherently decreasing. This does not significantly reduce the power output of the apparatus because, as the gaps between the members become smaller, a reduced magnetomotive force is capable of maintaining the same force of magnetic attraction.

Figure 3:
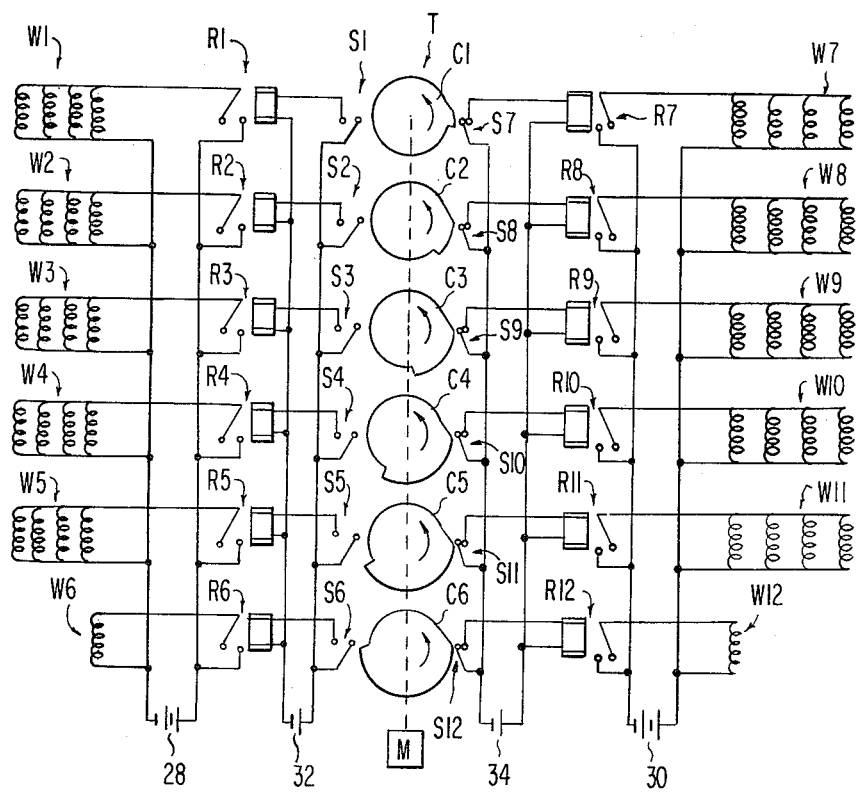
FIG. 3 is a schematic diagram of the timer and circuitry for controlling the operation of the apparatus.

A suitable system for controlling and energizing the magnets is shown in FIG. 3. In this drawing, "W" denotes electromagnet windings, "R" is used to identify relays, "S" signifies the relay-actuating switches and "C" indicates the timer cams which actuate the switches S. The numbers 1-12 used with these symbols identify the particular section of the electromagnet windings with which the component is associated.

The winding sections W1-W6 comprise the windings 14 on the electromagnet 8, and the winding sections W7-W12 form the windings 16 on the electromagnet 10. Winding sections W1-W5 and W7-W11 each include four coils wired in parallel. The sections W6 and W12 are single coils. By arranging the windings in sections and in parallel wired sets of coils, there is less inductance than would result from a long single length of wire, so that less time is required to build up the necessary magnetomotive force.

A direct current source 28 is used to energize the windings W1-W6, the source 28 being connectable to these windings by the movable switching contacts of relays R1-R6. In a similar fashion, the switching contacts of relays R7-R12, when closed by actuation of their respective relay coils, are operable to connect the direct current source 30 to the windings W7-W12 of electromagnet 10.

A timer assembly T is used to control the relays R1-R12. This timer assembly has a constant speed motor M with a shaft which is affixed to a set of timer cams C1-C6 as symbolically shown in broken lines. Each of the cams is operatively engaged with two diametrically opposed switches as, for example, cam C1 is engaged with and operable on the switches S1 and S7. Each of the switches S1-S12 is normally spring biased to an open position but, when it is closed by the rise on the adjacent cam, it completes a circuit which enables a respective direct current source 32 or 34 to energize the coil of a relay, causing the switching contacts of the relay to close and energizing the appropriate electromagnet windings.

As seen in FIG. 3, the switch-closing rises on the cams C1-C6 are of varying circumferential extents. The rises of the cams are as follows:
Cam C1—10°
Cam C2—40°
Cam C3—80°
Cam C4—120°
Cam C5—150°
Cam C6—175°.

Figure 4:
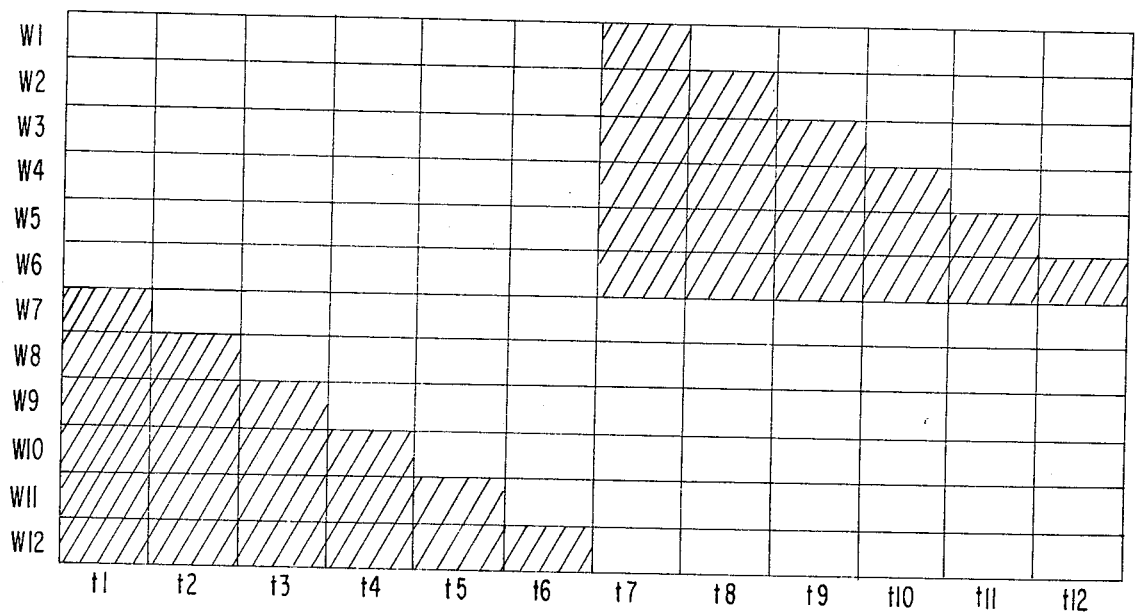
FIG. 4 is a time diagram which shows the sequential energization of the magnet windings.

The angular orientations of the cam rises are such that the magnet windings W1-W12 will be energized and deenergized in the sequence shown in FIG. 4. The time periods t1-t6 represent the operation of the apparatus in a mode where the driven member 6 is attracted and moved to the right. In time periods t7-t12, member 6 is attracted and moved in a leftward direction.

During the time period t1 at the first part of a cycle, all of the windings W7-W12 on magnet 10 are energized, providing a maximum magnetomotive force which will attract the members 4, 6 and 10 together, starting to close the gaps 20 and 22. The rise on cam C1 then moves past the switch S7, deenergizing relay R7 and windings W7 so that during time t2 there will be fewer ampere turns than during time t1. Further rotation of the timer shaft and cams will sequentially deactivate the windings W8, W9, W10 and W11. Finally, the single coil winding W12 is deactivated, at which time all of the windings W1-W6 on the left electromagnet 8 will be energized to commence the leftward movement phase of the cycle. This phase is identical to the phase already described, but it occurs in the opposite direction.

It is desirable, at the latter part of both phases, to deenergize a relatively small number of turns such as those in windings W6 and W12. Because less electrical current is involved when there are fewer turns, this will minimize any arcing of the relay switching contacts. An arc-suppressing R-C circuit may also be used. Another advantage of the smaller coils W6 and W12 is that there will be less residual magnetism to overcome when the system starts its movement in the opposite direction.

Figure 5:
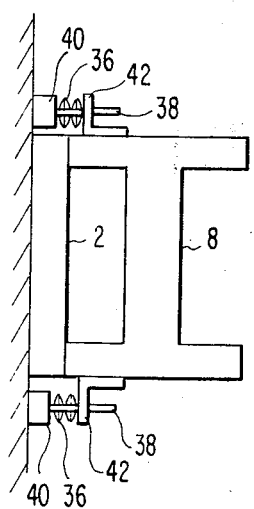
FIG. 5 illustrates a preferred feature for initiating separatory movement of the components of the apparatus.

Another feature which is useful to overcome the forces residual magnetism at the time of direction reversal is shown in FIG. 5. This involves sets of spring washers 36 which are mounted on stationary pins 38. When the magnet 8 arrives at its leftmost position, these washers are compressed between stationary anvils 40 and upstanding brackets 42 on the magnet. When the magnet 8 is fully deenergized, the energy stored in the compressed springs 36 will be released, biasing the magnet away from the reactor member 2. Similar sets of spring washers may also be operable between the members 6 and 8, 6 and 10, and 4 and 10. As an alternative to using spring washers 36, the magnet windings may be energized to provide a small reverse polarity at the end of a stroke to oppose any residual magnetism.

Figure 6:
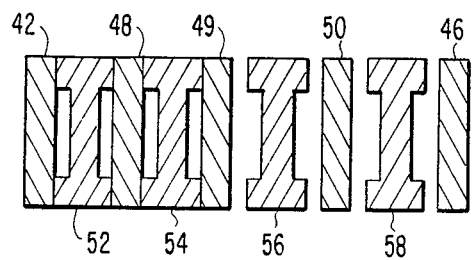
FIG. 6 shows a modified form of the invention in which four electromagnets are utilized.

The invention is susceptible to many modifications, one of which is shown in FIG. 6 where stationary paramagnetic reactor members are designated 44 and 46, longitudinally movable paramagnetic reactor members are shown at 48, 49 and 50, and movable electromagnets are shown at 52, 54, 56 and 58. Member 49 is the driven member. In such a system the windings of electromagnet 56 would be actuated and gradually deenergized during the first 90° of cam movement; and, the windings of electromagnet 58 would be actuated and gradually deenergized as the cam rotates from 90° to 180°. Electromagnet 54 would then operate to pull the driven member 49 to the left until the cam reaches its 270° position, and electromagnet 52 would be operable from 270° to 360°.

The gradual reduction of magnetomotive force may be done in two or more steps, six such steps having been found quite suitable in experimentation. As an alternative to deactivating discrete winding coils to reduce the ampere turns, it is possible to gradually reduce the current flowing through a constant number of winding turns.

Persons familiar with the art will recognize that the invention may be practiced by a wide variety of systems other than the preferred embodiments which have been described. For example, electromagnets may be substituted for one or more of the reactors. The electromagnets may have a variety of shapes, but the disclosed H-shape is preferred. Accordingly, it is emphasized that the invention is not limited to the systems disclosed herein but is embracing of many other apparatuses which fall within the spirit of the following claims.

I claim:

1. Apparatus for producing movement, comprising,
a pair of paramagnetic members which are relatively movable in an axial direction from mutually distant positions to mutually proximate positions, said members being separated by a gap which has an axial thickness and which opens and closes as the members move relatively away from and toward each other,
electrical windings on one of said paramagnetic members, said windings when energized being operable to provide a magnetic field which pulls the paramagnetic members together and closes the gap between them,
means for energizing the windings by causing an electrical current to flow therethrough creating a magnetomotive force in the respective paramagnetic member, and
control means for gradually reducing said magnetomotive force while the gap is being closed by the field and the axial thickness thereof is decreasing, whereby electrical energy is conserved.

2. The apparatus of claim 1 wherein the windings associated with a paramagnetic member includes a plurality of sections of windings, and the control means for gradually reducing the magnetomotive force includes means for sequentially deenergizing the sections of windings.

3. The apparatus of claim 2 wherein the control means includes means for simultaneously energizing all sections of windings associated with a paramagnetic member.

4. The apparatus of any one of claims 1, 2 or 3 wherein the control means includes a timer.

5. The apparatus of claim 4 wherein the timer includes a set of cams which rotate together at a constant angular velocity, and a set of electrical switches which are sequentially operated by the cams, each of said electrical switches being connected to one of said sections of windings.

6. The apparatus of claim 4 wherein the timer includes a set of rotary cams and a set of switches which are disposed where they are operated in sequence by the cams.

7. The apparatus of claim 6 wherein there are at least two said pairs of paramagnetic members, said timer including at least one rotary cam which is operatively engaged with two said switches which are associated with the windings of two different paramagnetic members.

8. Apparatus for producing movement of a driven body, comprising a set of axially aligned paramagnetic members, comprising,
a central paramagnetic member,
a spaced pair of paramagnetic members which are spaced apart by a constant distance and are located on opposite sides of the central member,
said members being arranged to permit axial movement between the central member and the spaced pair of members,
a first intermediate paramagnetic member located between the central paramagnetic member and one of the spaced pair of paramagnetic members, a second intermediate paramagnetic member located between the central paramagnetic member and the other paramagnetic member in the spaced pair,
energizing means being operable in a first mode to create magnetic attraction between the first intermediate member, the central member and one of the spaced pair of paramagnetic members produce movement in a first direction; said energizing means being operable in a second mode to create magnetic attraction between the second intermediate member, the central member and the other one of the spaced pair of paramagnetic members to move the driven member in a second direction which is opposite to said first direction, and means for repeatedly shifting said energizing means between the first mode and the second mode to produce movement alternately in the first and second directions.

9. Apparatus for producing movement of a driven body, comprising a set of aligned paramagnetic members, comprising, two stationary paramagnetic members, a driven paramagnetic member located between the stationary paramagnetic members and connected to the driven body, a first movable intermediate paramagnetic member located between one of the stationary paramagnetic members and the driven paramagnetic member, a second movable intermediate paramagnetic member located between the other stationary paramagnetic member and the driven paramagnetic member, said first and second intermediate paramagnetic members being on opposite sides of said driven paramagnetic member, energizing means being operable in a first mode to create magnetic attraction between the first intermediate member, the driven member and the first stationary member to move the driven member in a first direction; said energizing means being operable in a second mode to create magnetic attraction between the second intermediate member, the driven member and the second stationary member to move the driven member in a second direction which is opposite to said first direction, and means for repeatedly shifting said energizing means between the first mode and the second mode to move the driven member alternately in the first and second directions.

10. The apparatus of claim 9 including electromagnets which provide magnetomotive forces when energized by said energizing means, and control means for reducing said magnetomotive forces during movement of the driven member toward the respective electromagnet, whereby electrical energy is conserved.

11. The apparatus of claim 9 wherein the intermediate paramagnetic members are electromagnets, and the stationary and driven members are reactors which do not create a magnetic field.

* * * * *